No. 888,354. PATENTED MAY 19, 1908.
L. G. & H. J. ROHDE.
APPARATUS FOR ELEVATING GRAIN AND OTHER GRANULAR
OR PULVERULENT MATERIALS.
APPLICATION FILED SEPT. 13, 1906.
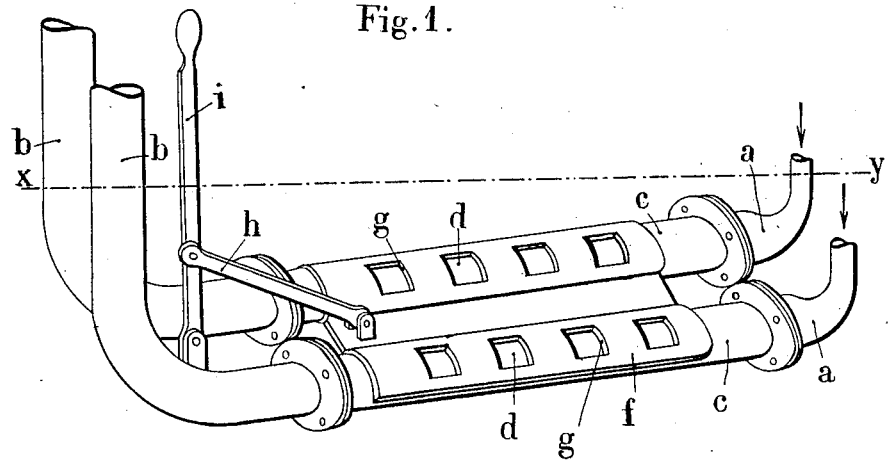
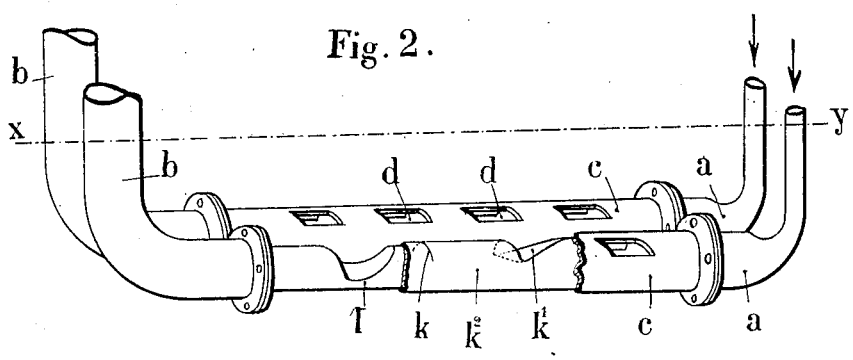
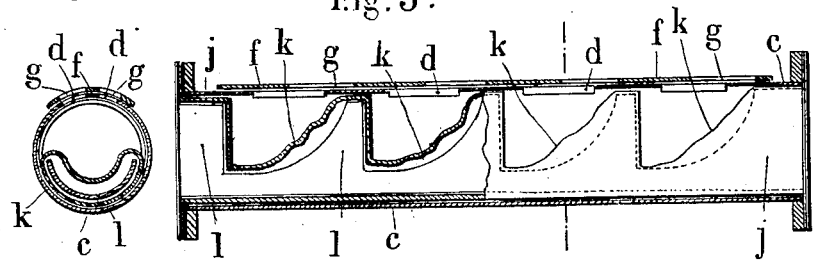
WITNESSES
W. M. Avery
C. R. Ferguson
INVENTORS
Louis Gaston Rohde
Henri Johannes Rohde
BY
Munn & Co
ATTORNEYS

UNITED STATES PATENT OFFICE.

LOUIS GASTON ROHDE AND HENRI JOHANNES ROHDE, OF PARIS, FRANCE.

APPARATUS FOR ELEVATING GRAIN AND OTHER GRANULAR OR PULVERULENT MATERIALS.

No. 888,354.  Specification of Letters Patent.  Patented May 19, 1908.

Application filed September 13, 1906. Serial No. 334,555.

*To all whom it may concern:*

Be it known that we, LOUIS GASTON ROHDE and HENRI JOHANNES ROHDE, both of 9 Rue Caumartin, in the city of Paris, Republic of France, builders, have invented Improvements in or Connected with Apparatus for Elevating Grain and other Granular or Pulverulent Material, of which the following is a full, clear, and exact description.

The present invention relates to an apparatus for elevating granular or pulverulent materials such as grain, sand, cement or the like which flow by gravity into the apparatus and are drawn or sucked by a current of air and are diverted by conduits at the desired level.

This invention has more particularly for its object means for regulating the admission of the material to be sucked in, consisting essentially in tubes provided with a series of orifices the area of which is adapted to be regulated by means of a sliding cover which can be displaced with regard to the orifices in such manner as to open or close completely or partially all the orifices together.

The interiors of the tubes are provided with flexible sleeves or valves which permit the material to enter the elevating apparatus by the orifices of the tubes and which close the openings at the moment that the pump forces a volume of air into the tube.

In the drawings: Figure 1 is a perspective view of the apparatus. Fig. 2 is a similar view to Fig. 1 but with the sliding cover removed and part of the walls of the device broken away to show the interior. Fig. 3 is a longitudinal section of one of the tubes and Fig. 4 is a transverse section thereof.

The apparatus represented in the drawings forms part of a whole comprising a portable steam engine driving an air pump the cylinder of which is arranged in such manner as to force air alternately into the two tubes $a$ and the system of admission which forms a principal feature of the object of the invention and the tubes $b$ into which the materials are sucked or drawn and which diverts them at the desired point.

As shown in the drawings the system of admission comprises two straight lengths of tube $c$ and these tubes $c$ are provided at their upper part with openings $d$.

A cover, formed by a plate $f$ curved to the arc of the tubes and having slots $g$ corresponding with the openings $d$ is provided and this cover $f$ is adapted to slide longitudinally of the tubes $c$ in such manner that when the openings $d$ and $g$ coincide the entrance orifices $d$ in the tubes are completely open and said cover $f$ may be slid or displaced so as to partially or completely close said openings.

The cover may be operated by any suitable means; in the drawings a link $h$ operated by a hand lever $i$ is shown as an example.

Upon the interiors of the tubes are flexible sleeves or valves $j$ of copper or other suitable material which are provided with transverse slits or notches $k$ in such manner that said sleeves are, with regard to the orifices $d$, movable parts opening them as at $k^1$ or closing them as at $k^2$.

Metallic tubes $l$ are placed upon the interior of the sleeves in order to support them and are notched as shown at Fig. 3 to form notches having vertical end walls and inclined bottom walls and arranged below the orifices $d$.

The operation of this apparatus is as follows: The apparatus is immersed or buried in the material to be sucked in which reaches for example the level $x$—$y$. If the cover $f$ is opened, the weight of the material tends to cause it to penetrate into the tubes $c$, the sleeve or valves $f$ of which take the position $k^1$. If a current of air is forced into the tubes $c$ at this moment the tubes $j$ re-assume a complete cylindrical form, the movable parts are re-closed as at $k^2$ and cover the orifices $d$. The material having previously penetrated the conduits $c$ is then forced along the same a given distance. When the current of air ceases the material again penetrates the tubes $c$ by pressing upon the movable parts or valves of the tubes $j$ which are driven back by the next current of air and so on.

The device is operated by pulsations which take place alternately in one or the other tube.

The arrangement hereinbefore described has the advantage of dividing up the quantity of material which is to penetrate into the tube and causing it to enter by several openings which greatly facilitate its entry, avoids the risks of obstruction, and insures a larger delivery. The operation can consequently be rendered very rapid and besides this there is the advantage of being able to regulate at will the quantity of material entering the tubes *c*.

The above arrangements are herein shown and described by way of example and the details of construction, shapes, dimensions and arrangements may be modified without departing from the principle of the invention.

Claims

1. An elevating apparatus comprising two tubes arranged side by side, and each having inlet openings in its top, a sliding plate having curved sections fitting upon the tubes and provided with openings adapted to register with the openings of the tubes, flexible sleeves within the tubes and provided with transverse slits, and metallic tubes within the sleeves and provided with notches opposite the slits of the sleeves.

2. An elevating apparatus, comprising a tube having inlet openings in its top, a movable cover fitting upon the sleeve and provided with openings adapted to register with the openings of said tube, a flexible sleeve in the tube and having slits below the openings of the tube, and a tube in the sleeve and provided with notches opposite the slits of the sleeve.

The foregoing specification of our improvements in or connected with apparatus for elevating grain and other granular or pulverulent material signed by us this 21st day of August, 1906.

LOUIS GASTON ROHDE.
HENRI JOHANNES ROHDE.

Witnesses:
HANSON C. COXE,
MAURICE H. PIGUET.